2,918,370
CALCIUM PANTOTHENATE COMPOSITION

Fred J. Helgren, Waukegan, Ill., assignor to Abbott Laboratories, North Chicago, Ill., a corporation of Illinois No Drawing. Application December 23, 1955
Serial No. 555,198

7 Claims. (Cl. 99—2)

This invention relates to improved compositions having a characteristic pantothenic acid response in animals and being suitable for use after storage.

Dextro calcium pantothenate is known to be an essential vitamin substance and to be necessary for proper growth and nutrition of man and animals. Since the dextro form of calcium pantothenate is relatively expensive, it is common practice to employ racemic or dl-calcium pantothenate which is about half as potent as the dextro form but is considerably less than half as costly. One principal disadvantage of the racemic form of calcium pantothenate is that it is highly hygroscopic and cakes and sticks badly upon storage. Attempts have been made in the past to prepare derivatives of calcium pantothenate which would be less hygroscopic but prior to this invention no completely satisfactory composition has been found.

It is a principal object of this invention to provide an inexpensive composition which will give a characteristic pantothenic acid response and yet will remain free-flowing upon storage.

In the accomplishment of the foregoing object and in accordance with the practice of this invention, there is now provided a combination of racemic or dextro calcium pantothenate with a starch and a polyvalent metal salt of a long-chain fatty acid. Said combination is found to have a characteristic pantothenic acid response in humans and in animals, and is found to remain dry and free-flowing even under adverse storage conditions. Suitable compositions of this invention comprise a mixture of from 10 to 50% by weight of racemic calcium pantothenate, 10 to 40% by weight of a polyvalent metal salt of a long-chain fatty acid, and the remainder starch. Dextro calcium pantothenate is somewhat less hygroscopic than the racemic form but it nevertheless tends to set up into a solid cake under normal conditions of storage. Since it is more expensive than the racemic form, it will usually be more suitable to employ racemic calcium pantothenate. Nevertheless, one may use the dextro form if desired and in compositions of the foregoing type it will be apparent that dextro calcium pantothenate will be used in approximately half the amount of the recemic form. That is, in the above-mentioned formula one will employ from 5 to 25% by weight of dextro calcium pantothenate, 10 to 40% by weight of said polyvalent metal salt and the remainder starch.

The polyvalent metal salt of a long-chain fatty acid referred to herein may be any one of the essentially water-insoluble, water-repelling compounds falling within this description, or it may be a combination of different salts falling within this definition. Such long-chain fatty acids as stearic acid, palmitic acid, oleic acid, lauric acid and the like are included. For polyvalent metals, one may use divalent metals such as calcium and magnesium, and trivalent metals such as aluminum. Because of their availability and relatively low cost, one may prefer to use calcium stearate, magnesium stearate, or aluminum palmitate or a mixture of these.

The starch referred to in the foregoing description may be any of the group of polysaccharides occurring in plant cells. The more common of these and the more economically desirable are corn starch, wheat starch, potato starch and rice starch, but it will be understood that others such as oat starch, arrowroot starch, bean starch, maize starch and the like are suitable for use in this invention. It will be apparent, of course, that the starch should be in the form of a dry, free-flowing powder prior to its admixture with the calcium pantothenate composition and the fatty acid salt. As previously indicated, a relatively large amount of starch may be employed if desired and the proportion may range from 10 to 85% of the total weight of the finished composition. Usually about 40% by weight will be used but if it is desired to increase or reduce the amount of either of the other components of the mixture, the amount of starch may be adjusted to make up the balance. Corn starch is especially suitable because of its availability at low cost, and in the form of dry, free-flowing powder.

The following description of the best method of making the composition of this invention is given for purposes of illustration and is not intended to be a limitation on the invention in any way.

About 45% by weight of racemic calcium pantothenate is placed in the hopper of a suitable mixer. About 15% by weight of calcium stearate, impalpable powder is added and mixing is continued until the calcium pantothenate appears to be coated by the particles of calcium stearate. In this stage the mixture exhibits an electrostatic charge and it tends to adhere to the mixer and other surfaces. About 40% by weight of corn starch is then added and mixing is continued until a homogeneous composition is obtained. The composition has no apparent electrostatic charge and it does not adhere to surfaces. On the contrary, it is a dry, free-flowing powder which remains free-flowing even after long storage under adverse conditions of relatively high humidity.

The composition of this invention is especially suitable for addition to animal feeds to provide calcium pantothenate in the diet of the animal in a convenient form. The need for calcium pantothenate to stimulate the proper growth and development of animals is firmly established. It is customary and good practice for the feeder to add a sufficient amount of the free-flowing composition of this invention to achieve a calcium pantothenate level in feed of from 1 to 12 grams per ton in chicken feed, from 8 to 24 grams per ton in turkey feed and from 8 to 27 grams per ton in swine feed. These figures correspond to concentrations of racemic calcium pantothenate of at least 0.0001% and preferably between 0.0002% and 0.003% in the feed. These levels are obtained by adding from about 4 to about 60 grams of the dry, free-flowing composition of this invention to a ton of feed. Calcium pantothenate is essentially non-toxic in any concentration which would be practical to admix in feed and therefore one may exceed the upper limits mentioned herein without danger. Economics will dictate, of course, that excesses should be avoided.

Others may practice the invention in any of the numerous ways which will be suggested to one skilled in the art upon a reading of this specification. It is intended that all such practice of the invention be included hereunder provided it falls within the scope of the appended claims.

I claim:

1. A dry, free-flowing composition having a characteristic pantothenic acid response in animals which comprises a mixture of 10 to 50% by weight of racemic calcium pantothenate, 10 to 40% by weight of a polyvalent metal salt of a long-chain fatty acid and the remainder starch.

2. A dry, free-flowing composition having a characteristic pantothenic acid response in animals which comprises a mixture of 5 to 25% by weight of dextro calcium pantothenate, 10 to 40% by weight of a polyvalent metal salt of a long-chain fatty acid selected from the group consisting of calcium stearate, magnesium stearate, and aluminum palmitate, and the remainder a dry, free-flowing starch.

3. A dry, free-flowing composition having a characteristic pantothenic acid response in animals which comprises a mixture of about 45 parts by weight of racemic calcium pantothenate, about 40 parts by weight of corn starch and about 15 parts by weight of calcium stearate.

4. An animal feed composition which comprises an animal feed and admixed therewith a dry, free-flowing composition comprising the combination of 10 to 50% by weight of racemic calcium pantothenate, 10 to 40% by weight of a polyvalent metal salt of a long-chain fatty acid and the remainder starch.

5. An animal feed composition comprising an animal feed and from about 4 to about 60 grams per ton of a dry, free-flowing composition having a characteristic pantothenic acid response in animals which comprises a mixture of 10 to 50% by weight of racemic calcium pantothenate, 10 to 40% by weight of a polyvalent metal salt of a long chain fatty acid and the remainder starch.

6. An animal feed composition which comprises an animal feed and from about 4 to about 60 grams per ton of a dry, free-flowing mixture of 5 to 25% by weight of dextro calcium pantothenate, 10 to 40% by weight of a polyvalent metal salt of a long-chain fatty acid and the remainder a dry, free-flowing starch.

7. An animal feed composition which comprises an animal feed and from about 4 to about 60 grams per ton of a dry, free-flowing mixture of about 45 parts by weight of racemic calcium pantothenate, about 40 parts by weight of corn starch and about 15 parts by weight of calcium stearate.

References Cited in the file of this patent

UNITED STATES PATENTS

| | | |
|---|---|---|
| 2,288,409 | Lippman et al. | June 30, 1942 |
| 2,444,215 | Whiteside et al. | June 29, 1948 |
| 2,555,463 | Bogin et al. | June 5, 1951 |
| 2,562,840 | Caldwell | July 31, 1951 |